United States Patent [19]

Hoying et al.

[11] Patent Number: 4,828,234

[45] Date of Patent: May 9, 1989

[54] HYDRAULIC ENGINE MOUNT WITH SELF-PUMPING AIR BLADDER

[75] Inventors: John F. Hoying, Bellbrook; Stanley E. Smith, Dayton, both of Ohio

[73] Assignee: General Motors Corporation, Detroit, Mich.

[21] Appl. No.: 248,850

[22] Filed: Sep. 26, 1988

[51] Int. Cl.⁴ .................. F16M 5/00; B60G 15/04
[52] U.S. Cl. ................. 267/140.1; 267/64.28; 267/219; 248/550
[58] Field of Search .............. 267/140.1, 219, 35, 267/64.11, 64.15, 64.27, 64.28, 64.17, 64.18, 64.19, 64.23, 122, 123; 180/312; 280/707; 248/550, 636, 638, 562, 566

[56] References Cited

U.S. PATENT DOCUMENTS

| | | | |
|---|---|---|---|
| 4,342,446 | 8/1982 | Eaton et al. | 267/35 |
| 4,415,148 | 11/1983 | Mair et al. | 267/122 |
| 4,558,173 | 12/1985 | Gajajiva et al. | 174/86 |
| 4,613,118 | 9/1986 | Morita | 267/140.1 |
| 4,666,016 | 5/1987 | Abe et al. | 267/140.1 X |
| 4,712,777 | 12/1987 | Miller | 267/140.1 |
| 4,720,084 | 1/1988 | Hollerweger et al. | 267/140.1 X |
| 4,756,513 | 7/1988 | Carlson et al. | 267/64.28 X |

FOREIGN PATENT DOCUMENTS

| | | |
|---|---|---|
| 77-195 | 4/1983 | European Pat. Off. . |
| 61-119832 | 6/1984 | Japan . |
| 59-222635 | 12/1984 | Japan . |
| 60-98237 | 6/1985 | Japan . |
| 0208649 | 10/1985 | Japan .................. 267/219 |
| 61-233237 | 10/1986 | Japan . |
| 0278639 | 12/1986 | Japan .................. 267/219 |

Primary Examiner—Andres Kashnikow
Assistant Examiner—Matthew C. Graham
Attorney, Agent, or Firm—Ronald L. Phillips

[57] ABSTRACT

A hydraulic mount assembly includes a pair of mounting members connected to each other through a hollow elastomeric body. The body is closed by a resilient diaphragm so as to form a cavity for hydraulic damping fluid. A partition or plate is provided to divide the fluid filled cavity into two distinct chambers and the partition may include a decoupler. A primary chamber is formed between the partition and the interior wall of the hollow body. An expandable pneumatic bladder is mounted within the primary chamber. A secondary chamber is formed between the partition and the interior wall of the diaphragm. A pumping chamber is formed by the diaphragm and a sealed base plate. Hydraulic fluid passes through the orifice track between the two chambers providing the damping action. As the fluid enters the secondary chamber, the diaphragm expands. Expansion/contraction of the diaphragm within the sealed pumping chamber creates a supply of positive/negative pressure air. A control circuit governs flow of air between the pump and the pneumatic bladder, thereby selectively modulating the overall damping and dynamic rate characteristics in response to sensed vehicle operating conditions.

3 Claims, 1 Drawing Sheet

HYDRAULIC ENGINE MOUNT WITH SELF-PUMPING AIR BLADDER

TECHNICAL FIELD

The present invention relates generally to hydraulic mounts for vibration damping and, more particularly, to a vehicle mounted hydraulic mount assembly including a self-contained pneumatic pump to inflate/deflate an internal air bladder designed to provide variable dynamic rate and damping characteristics in response to vehicle operating conditions.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly a high level of damping force and smoothing action. The high inertia of the hydraulic fluid passing through the orifice track contributes to the relatively hard mount characteristic in this mode. As a third (intermediate) operational mode of the mount, medium amplitude inputs produce lower velocity fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Such a hydraulic mount is disclosed in the copending Carlson et al patent application, Variable Hydraulic-Elastomeric Mount Assembly, Ser. No. 929,328, filed Nov. 10, 1986, now U.S. Pat. No. 4,756,513 assigned to of the present invention. This invention represents an improvement over previous mounts in that it provides variable damping levels in response to sensed vehicle operating conditions. This tuning of the mount is accomplished by the use of an inflatable air bladder on the secondary chamber side to selectively control the diaphragm movement. The bladder acts directly against the diaphragm to modulate the action of the mount assembly. The inflation of the bladder is directed by an external control circuit and provides infinite levels of damping. This control circuit includes a series of vehicle mounted tranducers communicating with a preprogrammed microprocessor. The transducers supply vehicle/component vibration information to the microprocessor which in turn directs the operation of the bladder. The orifice track sizes/lengths as well as the control circuit are designed to conform to each vehicle application.

Another recently developed hydraulic mount approaches the same desirable function of providing tuning of the mount, but in a different way. This mount, which has also proved successful, is disclosed in the copending Smith application, Air Bladder Controlled Hydraulic Engine Mount, Ser. No. 67/65,158, filed 3/7/88, assigned to the assignee of the present invention. This mount includes an air bladder within the primary chamber rather than on the secondary side. The same desirable result is to vary the levels of damping and rate in response to vehicle operating conditions. The bladder communicates with the atmosphere through a tube having a control valve. The pumping action of the fluid within the primary chamber of the mount is then utilized to inflate/deflate the bladder.

Improved engine isolation results from the generally softer damping action as the bladder compresses and inflates with ambient air according to the adjustment of the valve. The bladder expansion/contraction reduces the damping effect since the air, being compressible, takes precedence over hydraulic fluid movement along the orifice track and expansion/contraction of the diaphragm. Alternatively, the valve is closed completely and a variable pressure source is provided to actively inflate (or deflate) the bladder via a separate air pressure line.

While the Smith mount represents another significant improvement advance in the art over the original Carlson mount, further improvements are desirable. A particular need is identified in the area of further simplifying the mount system. It is desirable that a pneumatic pump for providing pressurized air to the bladder be incorporated into the structure of the mount itself. It would be very desirable for such a pump to be simply actuated as a result of the back and forth flow of damping fluid during vehicle operation. This would simplify the system and save the additional cost and weight of providing an external pump. At the same time, there must be no significant loss of the ability to provide the desirable variable damping levels throughout the range of vehicle operating conditions.

SUMMARY OF THE INVENTION

Accordingly, it is a primary object of the present invention to provide a hydraulic mount assembly overcoming the limitations and disadvantages associated with the relative complexity of the prior art mount systems.

It is an object of the invention also to provide a simplified and more economical mount system that is adjustable, wherein the mount assembly does include a self-contained pump for more efficient tuning action.

Another object of the present invention is to provide a hydraulic mount assembly that is actively tunable utilizing a bladder inflated by pressurized air from the damping action of the mount itself to provide variable damping characteristics so as to more efficiently and effectively isolate vibrations and suppress noise over the entire range of vehicle operating and road conditions.

Yet another object of the present invention is to provide a hydraulic mount that includes an internal pneumatic pump adjacent the secondary chamber to inflate or deflate the bladder as a result of the flow of damping fluid within the mount in response to vehicle vibrations thereby providing increased control of damping and dynamic rate and enhanced vehicle operating characteristics.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a tunable hydraulic mount assembly is provided including a pneumatic bladder on the primary chamber side similar to the Smith mount, as described above. The preferred embodiment of the mount assembly selected to help illustrate the inventive concepts includes a pair of mounting members connected to each other through a hollow elastomeric body. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm. The partition further includes a decoupler and a fluid passage or orifice track connecting the two chambers.

According to an important aspect of this invention, a self-contained pneumatic pump is provided to supply pressurized air to the pneumatic bladder located in the primary chamber of the mount. When inflated, the bladder serves to reduce damping to provide a softer mount for improved engine isolation. The softer mount can be readily returned to the high damping, engine control condition simply by evacuating the bladder. By tuning the damping characteristics of the mount to sensed vehicle operating conditions, more efficient vibration and interior noise suppression is possible.

Advantageously, the pump is actuated simply by the stretching action of the resilient diaphragm. During operation, as the fluid enters the secondary chamber the diaphragm expands. This expansion compresses air in a sealed pumping chamber surrounding the diaphragm. The resulting pressurized air can then be utilized to inflate the bladder. Conversely, the bladder can be evacuated by the pump. This is readily accomplished by providing fluid communication with the bladder during periods of diaphragm contraction. When the diaphragm contracts, the pressure in the pumping chamber goes negative. This negative pressure is then utilized to evacuate the bladder.

An important factor to consider with respect to the objectives of simplification and cost reduction of the system is that the basic structure of the previous mounts can be readily utilized to incorporate the pumping chamber concept of the present invention. More specifically, the mounting member adjacent the secondary chamber can be simply sealed from the atmosphere, thereby creating the pumping chamber. Fluid connections between the bladder and pump are simply incorporated and can be internal or external to the mount, depending upon design choice. A control circuit is provided to direct the air flow to or from the bladder in response to sensed vehicle operating conditions, maximizing tuning potential.

Important to the control circuit is a shuttle valve to direct the flow of air. The shuttle valve contains a spool which is positioned by an external actuator to direct the flow of air to inflate or deflate the bladder. A third or null position is provided to maintain the bladder pressure at a desired level while allowing the pumping chamber to "breathe" freely with the atmosphere. This allows free reciprocation of the mount by substantially removing any residual pressures in the pumping chamber underneath the diaphragm which might tend to inhibit free diaphragm expansion.

In operation of the mount, vibration forces within the design amplitudes and frequencies of the mount produce alternate contraction/expansion of the primary chamber. When the vibration is initiated, the liquid first causes reciprocation of the decoupler. Certain small vibratory amplitudes usually produced at high frequencies; for example, such as during smooth engine idling, are thus accomodated by the alternate increases and decreases in the chamber volumes resulting from decoupler reciprocation. As a result, significant fluid flow through the restricted passage or track between the chambers, and therefore damping is avoided.

In contrast, during large vibratory amplitudes, the decoupler ceases reciprocating and all damping fluid flow occurs between the primary and secondary chambers. This flow is through the orifice track in the partition. The resistance to flow of the hydraulic fluid and the fluid inertia provide the damping action.

To explain further, upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

The contraction or expansion of the pneumatic bladder in the primary chamber, as described above, in effect reduces the flow of hydraulic fluid between the two chambers. This is of course effective in reducing damping levels. In addition, at relatively high operating frequencies this same action allows the dynamic rate of the mount to be reduced to provide improved engine isolation.

To put it another way, some of the damping fluid compresses the bladder and the rest travels through the orifice track back and forth to the secondary chamber. This happens because the compressed air in the bladder offers less resistance, and thus depending on the pressure, takes precedence over the normal hydraulic fluid movement. This results in less damping fluid flows between chambers providing lower damping and a softer mount.

According to another important aspect of the present invention, a control circuit is provided to govern the ingress or egress of air from the pump to the pneumatic bladder. In the preferred embodiment, the shuttle valve and associated actuator are utilized. The actuator is governed by a microprocessor controller which responds to vehicle operating inputs and preprogramming to choose the most desirable damping level. The shuttle valve contains an internal spool which can be selectively positioned to uncover tubing connections to inflate or deflate the bladder. Advantageously, the null position is provided which neither inflates nor deflates the bladder thereby retaining a desired bladder pressure. In this way, the bladder can be fully inflated, fully deflated (evacuated) or inflated to any pressure in between. This provides maximum tuning potential of the mount.

Central to the performance of mount is an atmospheric vent line provided on the shuttle valve. This vent line works in concert with two oppositely mounted check valves and the shuttle valve to supply air to the pump during bladder inflation and exhaust air from the pump during bladder deflation. In this manner, full pressurization and evacuation is possible. Advantageously, when the shuttle valve is placed in the null position, the atmospheric vent is open, substantially preventing any retention of residual pressure in the pumping chamber, allowing free expansion/contraction of the diaphragm. This allows substantially unrestricted fluid motion within the mount and provides for optimum damping characteristics. Better control and fine tuning are therefore possible because the bladder can be inflated and held to an infinite number of pressures between full inflation and full evacuation.

The mount system also maintains the volume of the pneumatic bladder below a predetermined maximum limit. It has been found in working with other mounts that by allowing the pneumatic bladder volume to increase beyond a certain limit, the mount returns to relatively hard characteristics. Specifically, when the bladder volume and its associated pressure increases to a value beyond which the cycling internal pressures of the mount attain, the primary chamber internal pressure can no longer compress the bladder. A cage limiting the expansion of the bladder performs this function in accordance with the present invention.

The overall damping and rate characteristics of the mount are lessened at higher frequencies due mainly to smaller inertial forces in the fluid as a result of compressing the pneumatic bladder. These smaller inertial forces correspondingly produce less fluid flow through the orifice, resulting in lower damping. This avoids the undesirable high frequency hard characteristic of the mounts of the prior art. By limiting the maximum volume/pressure of the pneumatic bladder, a reduction in damping and rate is assured, and a disadvantageous return to hard mount characteristics is avoided. Accordingly, the mount is positively tuned to provide optimum damping and dynamic rate characteristics over all vehicle operating conditions.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing.

DETAILED DESCRIPTION OF THE INVENTION

Figure 1:
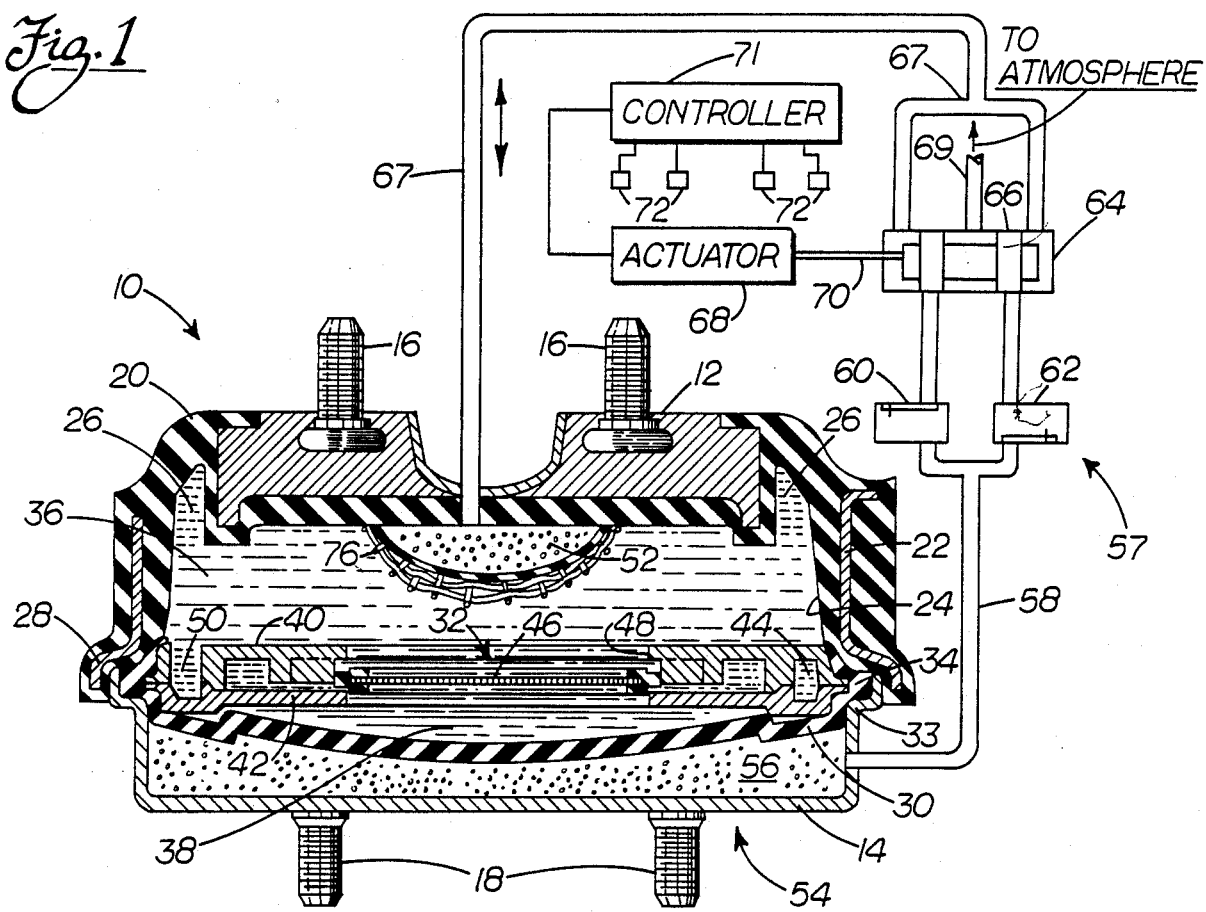
FIG. 1 is a cross-sectional view of the hydraulic mount assembly, including the pumping chamber and control circuit of the present invention.

Reference is now made to the drawing FIGS. 1 and 2 showing the preferred embodiment of the improved hydraulic-elastomeric mount assembly 10 of the present invention. The dynamic characteristics of the mount assembly 10 of the present invention may be adjusted or tuned to meet the specific vehicle application. As a result, the desired amplitude control, as well as the coefficient of damping and resulting dynamic rate best suited to isolate a wide range of particular vibration conditions can be obtained. The mount assembly 10 can of course be used in applications other than engine mounts, where controlled damping of vibration is desired especially with a reduced damping action at high frequencies.

The mount assembly 10 shown in FIG. 1 includes a cast metal mounting member 12 and stamped sheet metal mounting member 14. According to an important aspect of the present invention, the mounting member 14 is modified to form a closed pumping chamber for providing pressurized air. As will be fully described below, this pumping chamber concept advantageously provides for tuning of the damping characteristics of the mount during vehicle operation. The mounting members 12 and 14 have a pair of mounting studs 16, 18, respectively. These studs project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body 20 may be molded to and about the mounting member 12 and includes an embedded stamped sheet metal retainer 22.

The body 20 defines a hollow cavity 24 for receiving a damping liquid, such as commercial engine antifreeze/coolant. Oppositely located voids 26 are formed in the body between the mounting member 12 and the retainer 22. These voids 26 provide directional dynamic rate control within the elastomeric body 20 itself and form a part of the damping liquid cavity 24. As is known in the art, such voids 26 are especially useful in isolating certain internal combustion engine vibrations.

Together, the mounting member 12, elastomeric body 20 and metal retainer 22 form a first subassembly or cover of the mount assembly. The retainer 22 includes an outwardly projecting collar 28 at its lower periphery. The collar 28 is formed to receive a second subassembly or base. The base comprises the mounting member 14, elastomeric diaphragm 30 and a partition 32 with flow orifices to be described in detail below.

The elastomeric diaphragm 30 includes an annular rim portion 34 having a peripheral groove formed between upper and lower shoulders respectively. The shoulders are flexible so as to receive the outer edge of the partition 32. Thus, the partition 32 is sealingly engaged by the shoulders on opposite sides of the groove.

The mounting member 14 is formed with a collar 33 to receive the rim portion 34 of the diaphragm 30. Collar 33 of member 14 fits within collar 28 of the retainer 22. As is known in the art, tabs (not shown) may be provided on the collar 28 and bent over to retain and seal the whole mount assembly.

The elastomeric diaphragm 30 closes the elastomeric body 20 so as to form therewith the closed damping cavity 24. This cavity 24 is divided by the partition 32 into a primary chamber 36 enclosed by the elastomeric body 20 and a secondary chamber 38 enclosed by the diaphragm 30.

The partition 32 is formed of non-magnetic material, and includes a pair of plates 40, 42 with matching peripheries. Plates 40, 42 span the cavity 24 and cooperate to define a damping orifice track 44 interconnecting the chambers 36, 38.

A decoupler 46 in the form of a rectangular plate formed of metal or plastic is positioned in a central opening or orifice 48 in the plates 40, 42. The decoupler 46 is mounted for limited up and down reciprocal movement in the partition 32. The respective upper and lower faces of the decoupler 46 are directly engaged by the damping liquid within the primary and secondary chambers 36, 38. As a result, the decoupler 46 provides reciprocating movement in response to minimum amplitude alternating pressure build-ups in the chambers 36 38 acting on opposite faces of the decoupler. This reciprocating movement within the plates 40, 42 toward and away from the chambers 36, 38 produces a limited volume change that effects hydraulic decoupling.

Once the decoupling is overcome, the flow of damping fluid between the primary and secondary chambers 36, 38 is established. As shown, orifice track 44 communicates between the two chambers via opening 50 in plate 40 and an orifice in plate 42 (not shown). The length of track 44 can be fine tuned to the particular resonance frequencies of the component being damped.

This hydraulic fluid flow provides the damping action of the standard (Gold type) mount. This standard action generally increases above the 16 hertz (Hz) level and then tapers off at higher frequencies.

In accordance with the present invention and as is shown in FIG. 1, a pneumatic bladder 52 is provided in the primary chamber 36 of the mount assembly 10.

When the bladder 52 is inflated (see FIG. 1), some of the increased internal hydraulic pressure in the primary chamber 36 is expended by compressing the air in the bladder 52. Since the air is relatively easy to compress as compared to the damping movement of the hydraulic fluid, less hydraulic fluid flow occurs through the orifice track 44, thereby reducing damping. On the return stroke, the bladder 52 enlarges to its original size, thereby reducing the amount of hydraulic fluid that must be returned from the secondary chamber 38, and again reducing the damping effect. As a result, the overall damping level is reduced.

According to an important aspect of the present invention, a self-contained pneumatic pump 54 is provided to inflate/deflate the bladder 52. Advantageously, the pump 54 is readily incorporated into the mounting member 14 of the prior art mount. This is accomplished simply by sealing the mounting member 14 to the surrounding atmosphere. In this manner, a sealed base plate is provided, creating a sealed pumping chamber 56, between the inside surface of the mounting member 14 and the outer wall of the diaphragm 30.

During operation of the mount, as the diaphragm 30 expands within the pumping chamber 56, the air contained within the chamber 56 is compressed. The resultant pressurized air can then be utilized to inflate the bladder 52 with positive air pressure. Alternately, when the diaphragm contracts within the pumping chamber 56, the air pressure drops. The resultant negatively pressurized air can then be utilized to evacuate the bladder 52.

In order to achieve the controlled pressurization of the bladder 52, a pneumatic control circuit 57 is provided. The control circuit 57 includes air transfer line 58, check valves 60 and 62 and a three-way shuttle valve 64. The shuttle valve 64 contains an internal spool 66 which is selectively positioned by actuator 68. The actuator, which can be a solenoid, is connected directly to the spool 64 by an actuating rod 70. A preprogrammed microprocessor controller 71 directs the actuator 68, and thus the shuttle valve 64, in response to sensed vehicle operating conditions obtained from vehicle mounted transducers 72.

Figure 2A:
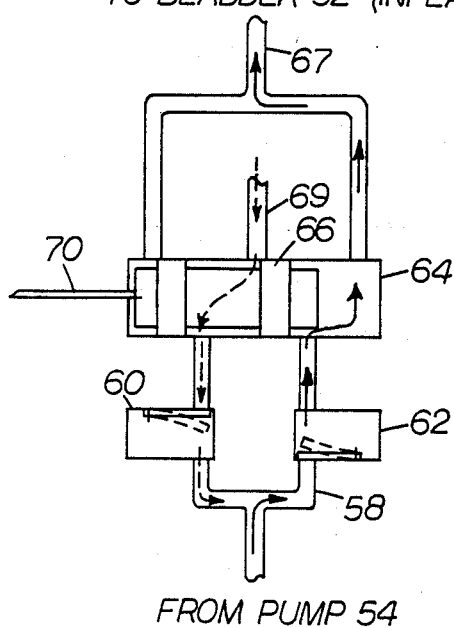
FIG. 2A shows the control circuit in another mode of operation (bladder inflate position)

During operation, the control circuit 57 continuously monitors the vehicle operating characteristics. When a reduction in damping is desirable, for example, the control circuit responds and the spool 66 is moved within the shuttle valve 64 to the inflate position, as shown in FIG. 2A. As shown by the solid flow arrows, the compressed air from the pump 54 via line 58 and the associated Y-connector enters the check valves 60 and 62. As illustrated by the position of the internal one-way flappers of the valves 60, 62, the air is prevented from continuing through check valve 60, but continues through the check valve 62. The pressurized air then enters the shuttle valve 64 and due to the position of the spool 66 continues through another Y-connector and the feed line 67 into the bladder 52. In this manner, the bladder 52 is inflated.

As shown by the dotted arrows in FIG. 2A, and upon subsequent contraction of the diaphragm 30 within the pump 54, air is drawn through atmospheric vent line 69, through the shuttle valve 64 and through the check valve 60. This ambient air then enters the pump 54 to prevent a vacuum (negative pressure) from being formed: i.e. the pumping chamber 56 is recharged with atmospheric pressure in preparation for the next pressurization cycle. As shown by the position of the spool 66, the pressure inflating the bladder 52 (through the feed line 67) is prevented from escaping to the atmosphere through the vent line 69. Additionally, the position of the flapper in the check valve 62, shown in the dotted position, prevents the pressurized air in the bladder 52 from returning toward the pump 54. Once the diaphragm 30 reaches the end of its movement or stroke, the flapper closes and the pressure remains in the bladder 52. In this manner, reliable and accurate pressurization of the bladder 52 is possible. Progressive pressurization of the bladder is possible as the pumping cycle is simply repeated. The progressive pressurization feature allows for an infinite variation of the tuning in this mode. As shown in FIG. 1, a cage 76 is provided to prevent overinflation and a disadvantageous return to relatively hard mount characteristics, as described above.

Figure 2B:
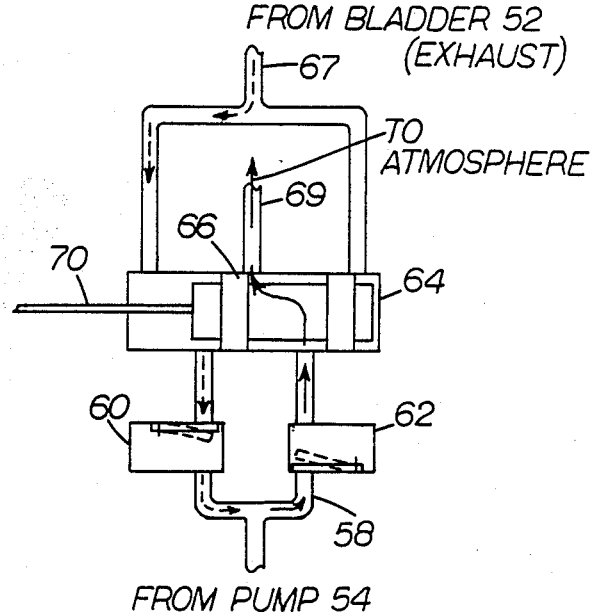
FIG. 2B shows the control circuit in still another mode (bladder deflate position).

Deflation or exhaustion of the bladder 52 is accomplished in a similar manner. As shown in FIG. 2B, the spool 66 is moved by the actuator 68 to the opposite position within the three-way shuttle valve 64. As shown by the solid arrows in FIG. 2B, the pressurized air from the pump 54 which results from diaphragm expansion (pressurization cycle) exhausts to the atmosphere by passing through the check valve 62, through the shuttle valve 64 and ultimately through the atmospheric vent line 69. Any built-up pressure in the bladder 52 is also released to the atmosphere through the valves 60, 62 (see dotted line flow arrows). Pressurized air is prevented from traveling back through the check valve 60 and into the bladder 52 by the position of the internal flapper.

After exhausting the positive pressure, on the next cycle the contraction of the diaphragm 30 causes a resultant negative pressure or suction to pull air from the bladder 52, also as shown by the dotted arrows in FIG. 2B. Here again, the position of the spool 66 within the shuttle valve 64 prevents the pressurized air from exhausting directly to the atmosphere thereby facilitating a complete evacuation of the bladder 52.

As shown by the position of the spool 66 in FIG. 1, a null or cut-off position is also available. When the control circuit 57 chooses this position, all air flow into or out of the bladder 52 is terminated. Additionally, the pumping chamber 56 is vented to the atmosphere through the vent line 69. As shown in this position, both the check valves 60, 62 are in fluid communication with the vent line 69. This allows two way communication between the pump and the atmosphere, substantially preventing any pressure/vacuum build-up within the pumping chamber 56. This provides for substantially uninhibited expansion/contraction of the diaphragm 30 and therefore free action of the mount assembly 10. In this way, a desirable degree of the inflation/deflation by the bladder 52 can be obtained and then held until such time as additional tuning of the mount assembly 10 is desirable.

It should be emphasized that the above pressurization and depressurization of the bladder 52 is continuously controlled by the controller 71 of the control circuit 57. In this manner, the tuning or modulating of the hydraulic mount is advantageously essentially infinitely variable and continuously monitored throughout the entire range of vehicle operating conditions. Also, by pulsing of the actuator 68 between the null position (FIG. 1) and the inflate or deflate valve modes of FIGS. 2A, 2B, other infinite variations in control can be realized. For example, there can be a gradual reduction of the negative pressure (vacuum) in the bladder 52 by timed cycling of the spool 66 into and out of the inflate mode of FIG. 2A; or a gradual reduction in the positive pressure can be obtained by like cycling with respect to the exhaust mode of FIG. 2B.

It should be pointed out that a distinct advantage in providing the pump 54 within the hydraulic mount assembly 10 lies in the elimination of the necessity for an external means for pressurization and evacuation of the bladder 52. This simplifies the mount system and provides a concomitant significant reduction in cost.

In summary, numerous benefits result from employing the concepts of the present invention. The hydraulic mount assembly 10 includes an internal or self-contained pump 54 which can be alternately used to pressurize or evacuate the pneumatic bladder 52. When the bladder 52 is inflated, the overall damping of the mount 10 is lessened. Alternately, when the bladder 52 is fully evacuated, the mount returns to relatively hard damping characteristics. The control circuit 57 and the shuttle valve 64 advantageously provide for infinitely variable tuning of the mount damping characteristics. Advantageously, a most desirable balance of engine control versus engine isolation can thus be provided at all times, throughout the entire range of vehicle operating conditions. The full range of control is obtained without employing outside pressure means, as previously deemed to be important.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modications and variations are within the scope of the invention as determined by the appended claims when interpreted in accordance with breadth to which they are fairly, legally and equitably entitled.

We claim:

1. A hydraulic mount assembly for a vehicle, comprising:

a pair of mounting members;

a hollow body connected to said mounting members;

a resilient diaphragm closing said hollow body and forming therewith closed cavity that is filled with hydraulic fluid;

means for partitioning said cavity into a primary chamber and a secondary chamber enclosed by said diaphragm;

an expandable pneumatic bladder mounted within said primary chamber;

pneumatic pump means actuated by said diaphragm;

circuit means for providing fluid communication between said bladder and said pump means; and control means in said circuit means to control the flow of air from said pump means into and out of said bladder;

whereby the damping and dynamic rate characteristics of said hydraulic mount assembly may be controlled to provide optimum vehicle operating characteristics.

2. A hydraulic mount assembly for a vehicle, comprising:
- a pair of mounting members;
- a hollow body connected to said mounting members;
- a resilient diaphragm closing said hollow body and forming therewith a closed cavity that is filled with hydraulic fluid;
- means for partitioning said cavity into a primary chamber and a secondary chamber enclosed by said diaphragm;
- an expandable pneumatic bladder mounted within said primary chamber;
- pneumatic pump means within said body actuated by said diaphragm;
- circuit means for providing fluid communication between said bladder and said pump;
- control means in said pneumatic circuit means to control the flow of air from said pump means into and out of said bladder, said control means including means for sensing vehicle operating conditions;
- said control means further including a three-way valve to alternately switch said bladder between said pump, the atmosphere and a null position to control the flow of air in said pneumatic circuit into and out of said bladder;
- whereby the damping and dynamic rate characteristics of said hydraulic mount assembly may be tuned to provide optimum damping and vehicle component isolation characteristics.

3. A hydraulic mount assembly for a vehicle, comprising:
- a pair of mounting members;
- a hollow body connected to said mounting members;
- a resilient diaphragm closing said hollow body and forming therewith a closed cavity that is filled with hydraulic fluid;
- means for partitioning said cavity into a primary chamber and a secondary chamber enclosed by said diaphragm;
- an expandable pneumatic bladder mounted within said primary chamber;
- pneumatic pump means actuated by said diaphragm to provide positive and negative pressure air to selectively pressurize and evacuate said bladder, said pump means including a sealed base plate adjacent said hollow body and providing a pumping chamber with said diaphragm positioned on one side;
- circuit means for providing fluid communication between said bladder and said base plate; and
- control means in said circuit means to control the flow of air from said pump means into and out of said bladder, said control means including means for sensing vehicle operating conditions;
- whereby, the damping and dynamic rate characteristics of said hydraulic mount assembly may be controlled t provide optimum vehicle operating characteristics.

* * * * *